US012587331B2

(12) United States Patent
Liu et al.

(10) Patent No.: US 12,587,331 B2
(45) Date of Patent: Mar. 24, 2026

(54) METHOD AND APPARATUS FOR DETERMINING ACTIVE BANDWIDTH PART

(71) Applicant: LENOVO (BEIJING) LIMITED, Beijing (CN)

(72) Inventors: Hongmei Liu, Beijing (CN); Zhi Yan, Beijing (CN); Yuantao Zhang, Beijing (CN); Bingchao Liu, Beijing (CN); Haiming Wang, Beijing (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 426 days.

(21) Appl. No.: 18/248,970

(22) PCT Filed: Oct. 14, 2020

(86) PCT No.: PCT/CN2020/120852
§ 371 (c)(1),
(2) Date: Apr. 13, 2023

(87) PCT Pub. No.: WO2022/077259
PCT Pub. Date: Apr. 21, 2022

(65) Prior Publication Data
US 2023/0412337 A1 Dec. 21, 2023

(51) Int. Cl.
*H04L 5/00* (2006.01)
*H04W 72/20* (2023.01)

(52) U.S. Cl.
CPC .......... *H04L 5/0048* (2013.01); *H04L 5/0094* (2013.01); *H04W 72/20* (2023.01)

(58) Field of Classification Search
CPC ..... H04L 5/0048; H04L 5/0094; H04W 72/20
See application file for complete search history.

(56) References Cited

U.S. PATENT DOCUMENTS

| | | | |
|---|---|---|---|
| 2018/0323928 A1 | 11/2018 | Yang | |
| 2019/0132109 A1* | 5/2019 | Zhou | H04L 27/2607 |
| 2019/0174466 A1* | 6/2019 | Zhang | H04L 5/0057 |
| 2019/0357292 A1* | 11/2019 | Cirik | H04W 76/19 |

FOREIGN PATENT DOCUMENTS

| | | |
|---|---|---|
| CN | 110214426 A | 9/2019 |
| CN | 111615195 A | 9/2020 |
| CN | 111742516 A | 10/2020 |
| WO | 2019098762 A1 | 5/2019 |

OTHER PUBLICATIONS

International Search Report and Written Opinion dated Jun. 23, 2021 for International Application No. PCT/CN2020/120852.

* cited by examiner

*Primary Examiner* — Duc C Ho
(74) *Attorney, Agent, or Firm* — AMPACC Law Group, PLLC

(57) ABSTRACT

Embodiments of the present application are related to a method and apparatus for determining active bandwidth part (BWP). According an embodiment of the present application, an exemplary method includes: receiving first configuration information indicating association between BWP and reference signal (RS); determining a first RS, which is indicated by second configuration information, or user equipment (UE) selected, or predefined in specification(s); and determining an active BWP based on the first RS and the association between BWP and RS.

20 Claims, 7 Drawing Sheets receiving first configuration information indicating association between BWP and RS — 301 determining a first RS, which is indicated by second configuration information, or UE selected, or predefined in specification(s) — 303 determining an active BWP based on the first RS and the association between BWP and RS — 305 transmitting first configuration information indicating association between BWP and RS

401 determining a first RS

403 determining an active BWP based on the first RS and the association between BWP and RS

405

UE

BS

UE                                                          BS

METHOD AND APPARATUS FOR DETERMINING ACTIVE BANDWIDTH PART

CROSS REFERENCE TO RELATED APPLICATIONS

This application is a national phase entry of International Application No. PCT/CN2020/120852 filed Oct. 14, 2020, which is incorporated by reference in its entirety.

TECHNICAL FIELD

Embodiments of the present application generally relate to wireless communication technologies, especially to a method and apparatus for determining active bandwidth part (BWP) in a wireless communication system.

BACKGROUND

Wireless communication systems are widely deployed to provide various telecommunication services such as telephony, video, data, messaging, broadcasts, and so on. Wireless communication systems may employ multiple access technologies capable of supporting communication with multiple users by sharing available system resources (e.g., time, frequency, and power). Examples of wireless communication systems may include fourth generation (4G) systems such as long term evolution (LTE) systems, LTE-advanced (LTE-A) systems, or LTE-A Pro systems, and fifth generation (5G) systems which may also be referred to as new radio (NR) systems.

To extend the coverage and availability of wireless communication systems (e.g., 5G systems), satellite and high-altitude platforms may be utilized as relay devices in communications related to ground devices such as user equipment (UE). Network or segment of network using radio frequency (RF) resources on board a satellite or an airborne aircraft may be referred to as a non-terrestrial network (NTN). In an NTN network, some or all functions of a base station (BS) may be deployed in a satellite or an airborne aircraft.

Considering the beam reciprocity between downlink (DL) and uplink (UL) in the NTN network, a mechanism of simultaneous DL and UL BWP switching is proposed in the industry to save signaling overhead. Accordingly, a new active BWP after the BWP switching should be determined. However, the determination of the new BWP is restricted by multiple factors, e.g., the purpose of reference signal (RS) to be transmitted in the BWP, and the association between BWP and RS etc.

Thus, it is desirable to provide a technical solution to improve BWP determination or selection to adapt the industry trend.

SUMMARY OF THE DISCLOSURE

One objective of the present application is to provide a method and apparatus for determining an active BWP during wireless transmission.

According to an embodiment of the present application, a method may include: receiving first configuration information indicating association between BWP and RS; determining a first RS, which is indicated by second configuration information, or user equipment (UE) selected, or predefined in specification(s); and determining an active BWP based on the first RS and the association between BWP and RS.

In some embodiments of the present application, the first RS is at least one aperiodic sounding reference signal (SRS) triggered by downlink control information (DCI). In some scenarios, the first RS is associated with one of a channel state information (CSI)-RS and synchronization signal block (SSB), and the association between BWP and RS indicates the association between the active BWP and the one of the CSI-RS and the SSB. In some scenarios, the association between BWP and RS indicates the association between the active BWP and the first RS. The method may include: determining a time domain offset between the DCI and transmission of the at least one aperiodic SRS based on subcarrier spacing (SCS) of the active BWP. A minimal time interval between a last symbol of a physical downlink control channel (PDCCH) including the DCI and a first symbol of a first SRS of the at least one aperiodic SRS is also determined based on the SCS of the active BWP.

In some other embodiments of the present application, the first RS is SSB indicated by PDCCH order, and the association between BWP and RS indicates the association between the active BWP and the SSB. The method may include: transmitting at least one of Msg 1, Msg 3 and physical uplink control channel (PUCCH) on the active BWP in the case of the active BWP being uplink BWP. In another example, the method may include: monitoring the PDCCH and corresponding physical downlink shared channel (PDSCH) scheduled by the PDCCH on the active BWP in the case of the active BWP being downlink BWP.

In some yet other embodiments of the present application, the first RS is UE selected SSB for determining random access channel (RACH) occasion (RO) for physical random access channel (PRACH) transmission, and the association between BWP and RS indicates the association between the active BWP and the SSB. The method may include: determining whether the active BWP is an uplink BWP for PRACH transmission based on whether there is RACH resource configuration on the active BWP. The method may also include: in the case that there is RACH resource configuration, transmitting the PRACH transmission on the active BWP as uplink BWP; and in the case that there is no RACH resource configuration, transmitting the PRACH transmission on a common uplink BWP different from the active BWP. The common uplink BWP is used for SRS transmission for beam management. In the case that there is RACH resource configuration, the method may include: transmitting physical uplink shared channel (PUSCH) and PUCCH on the active BWP as uplink BWP. In another example, the method may include: determining whether the active BWP is a downlink BWP for PDCCH monitoring based on whether there is RACH resource configuration on an associated uplink active BWP. In the case that there is RACH resource configuration, the method may include: monitoring the PDCCH and PDSCH on the active BWP as downlink BWP; and in the case that there is no RACH resource configuration, monitoring the PDCCH on a common downlink BWP different from the active BWP. The common downlink BWP is used for CSI-RS transmission for beam management.

In some yet other embodiments of the present application, the first RS is associated with a candidate RS during a backhaul failure recovery (BFR) procedure. The candidate RS is one of a CSI-RS and SSB, and the association between BWP and RS indicates the association between the active BWP and the one of the CSI-RS and the SSB. In an example, the method may include: transmitting at least one of PRACH, PUSCH and PUCCH on the active BWP in the case of the active BWP being uplink BWP. In another example, the method may include: monitoring the PDCCH and corresponding PDSCH scheduled by the PDCCH on the active BWP in the case of the active BWP being downlink BWP. In yet another example, the method may include: determining whether the active BWP is an uplink BWP for PRACH transmission based on whether there is RACH resource configuration on the active BWP. The method may include: in the case that there is RACH resource configuration, transmitting the PRACH transmission on the active BWP as uplink BWP; and in the case that there is no RACH resource configuration, transmitting the PRACH transmission on a common uplink BWP different from the active BWP. The common uplink BWP is used for SRS transmission for beam management. In yet another example, the method may include: in the case that there is RACH resource configuration, transmitting PUSCH and PUCCH on the active BWP as uplink BWP. In yet another example, the method may include: determining whether the active BWP is a downlink BWP for PDCCH monitoring based on whether there is PRACH resource configuration on an associated uplink active BWP. The method may also include: in the case that there is RACH resource configuration, monitoring the PDCCH and PDSCH on the active BWP as downlink BWP; and in the case that there is no RACH resource configuration, monitoring the PDCCH on a common downlink BWP different from the active BWP. The common downlink BWP is used for CSI-RS transmission for beam management.

According to another embodiment of the present application, a method may include: transmitting first configuration information indicating association between BWP and RS; determining a first RS, which is to be transmitted by second configuration information, or user equipment (UE) selected, or predefined in specification(s); and determining an active BWP based on the first RS and the association between BWP and RS.

In some embodiments of the present application, the first RS is at least one aperiodic SRS triggered by DCI. The first RS is associated with one of a CSI-RS and a SSB, and the association between BWP and RS indicates the association between the active BWP and the one of the CSI-RS and the SSB. The method may include: determining a time domain offset between the DCI and transmission of the at least one aperiodic SRS based on SCS of the active BWP. A minimal time interval between a last symbol of a PDCCH including the DCI and a first symbol of a first SRS of the at least one aperiodic SRS is also determined based on the SCS of the active BWP.

In some other embodiments of the present application, the first RS is SSB indicated by PDCCH order, and the association between BWP and RS indicates the association between the active BWP and the SSB. The method may include: receiving at least one of Msg 1, Msg 3 and PUCCH on the active BWP in the case of the active BWP being uplink BWP. In another example, the method may include: transmitting the PDCCH and corresponding PDSCH scheduled by the PDCCH on the active BWP in the case of the active BWP being downlink BWP.

In some yet other embodiments of the present application, the first RS is UE selected SSB for determining RO for PRACH transmission, and the association between BWP and RS indicates the association between the active BWP and the SSB. The method may include: determining whether the active BWP is an uplink BWP for PRACH transmission based on whether there is RACH resource configuration on the active BWP. The method may also include: in the case that there is RACH resource configuration, receiving the PRACH transmission on the active BWP as uplink BWP; and in the case that there is no RACH resource configuration, receiving the PRACH transmission on a common uplink BWP different from the active BWP. The common uplink BWP is used for SRS transmission for beam management. In the case that there is RACH resource configuration, the method may include: receiving PUSCH and PUCCH on the active BWP as uplink BWP. In another example, the method may include: determining whether the active BWP is a downlink BWP for PDCCH transmitting based on whether there is RACH resource configuration on an associated uplink active BWP. In the case that there is RACH resource configuration, the method may include: transmitting the PDCCH and PDSCH on the active BWP as downlink BWP; and in the case that there is no RACH resource configuration, transmitting the PDCCH on a common downlink BWP different from the active BWP. The common downlink BWP is used for CSI-RS transmission for beam management.

In some yet other embodiments of the present application, the first RS is associated with a candidate RS during a BFR procedure. The candidate RS is one of a CSI-RS and SSB, and the association between BWP and RS indicates the association between the active BWP and the one of the CSI-RS and the SSB. In an example, the method may include: receiving at least one of PRACH, PUSCH and PUCCH on the active BWP in the case of the active BWP being uplink BWP. In another example, the method may include: transmitting the PDCCH and corresponding PDSCH scheduled by the PDCCH on the active BWP in the case of the active BWP being downlink BWP. In yet another example, the method may include: determining the active BWP as uplink BWP for PRACH transmission based on whether there is RACH resource configuration on the active BWP. The method may include: in the case that there is RACH resource configuration, receiving the PRACH transmission on the active BWP as uplink BWP; and in the case that there is no RACH resource configuration, receiving the PRACH transmission on a common uplink BWP different from the active BWP. The common uplink BWP is used for SRS transmission for beam management. In yet another example, the method may include: in the case that there is RACH resource configuration, receiving PUSCH and PUCCH on the active BWP as uplink BWP. In yet another example, the method may include: determining the active BWP as downlink BWP for PDCCH transmitting based on there is PRACH resource configuration on an associated uplink active BWP. The method may also include: in the case that there is RACH resource configuration, transmitting the PDCCH and PDSCH on the active BWP as downlink BWP; and in the case that there is no RACH resource configuration, transmitting the PDCCH on a common downlink BWP different from the active BWP. The common downlink BWP is used for CSI-RS transmission for beam management.

According to yet another embodiment of the present application, a method may include: receiving DCI with a field "CSI request" indicating CSI reporting; and determining an active downlink BWP based on the received DCI.

In some embodiments of the present application, determining the active downlink BWP based on the received DCI may further include: determining a CSI report index associated with a CSI request indicated in the field "CSI request"; determining CSI resource configuration associated with the CSI report index; and determining the active BWP based on the CSI resource configuration.

According to yet another embodiment of the present application, a method may include: determining an active downlink BWP, and transmitting DCI with a field "CSI request" indicating CSI reporting for indicating the BWP.

In some embodiments of the present application, the method may further include: determining CSI resource configuration based on the active BWP; determining a CSI report index associated with CSI resource configuration; and determining a CSI request indicated in the field "CSI request" associated with the CSI report index.

According to yet another embodiment of the present application, a method may include: receiving configuration information indicating a RS, and determining an active BWP based on whether the RS is for beam management.

In some embodiments of the present application, in the case that the RS is for beam management, the active BWP is determined as a BWP preconfigured by broadcast or radio resource control (RRC) signaling or predefined in specification(s). In the case that the RS is not for beam management, the active BWP is determined based on information associated with the RS. In the case that the RS is CSI-RS, whether the RS is for beam management is determined based on parameters "repetition" and "TRS-info." In the case that the RS is sounding reference signal (SRS), whether the RS is for beam management is determined based on parameter "usage."

According to yet another embodiment of the present application, a method may include: determining an active BWP based on whether a RS associated with the active BWP is for beam management; and transmitting configuration information indicating the RS.

In some embodiments of the present application, in the case that the RS is for beam management, the active BWP is determined as a BWP preconfigured by broadcast or RRC signaling or predefined in specification(s). In the case that the RS is not for beam management, the active BWP is determined based on information associated with the RS. In the case that the RS is CSI-RS, whether the RS is for beam management is determined based on parameters "repetition" and "TRS-info." In the case that the RS is sounding reference signal (SRS), whether the RS is for beam management is determined based on parameter "usage."

In addition, an embodiment of the present application also provides an apparatus for performing a method according to an embodiment of the present application, e.g., a method as stated above. An exemplary apparatus may include: at least one non-transitory computer-readable medium having stored thereon computer-executable instructions; at least one receiving circuitry; at least one transmitting circuitry; and at least one processor coupled to the at least one non-transitory computer-readable medium, the at least one receiving circuitry and the at least one transmitting circuitry. The computer-executable instructions cause the at least one processor to implement any method according to an embodiment of the present application with the at least one receiving circuitry and the at least one transmitting circuitry.

Embodiments of the present application can solve the technical problems on determining an active BWP caused by BWP switching in view of various restrictions, e.g., association between BWP and RS, and will facilitate the deployment and implementation of the NR.

BRIEF DESCRIPTION OF THE DRAWINGS

In order to describe the manner in which the advantages and features of the disclosure can be obtained, a description of the disclosure is rendered by reference to specific embodiments thereof, which are illustrated in the appended drawings. These drawings depict only exemplary embodiments of the disclosure and are not therefore to be considered limiting of its scope.

DETAILED DESCRIPTION

The detailed description of the appended drawings is intended as a description of the preferred embodiments of the present application and is not intended to represent the only form in which the present application may be practiced. It should be understood that the same or equivalent functions may be accomplished by different embodiments that are intended to be encompassed within the spirit and scope of the present application.

Reference will now be made in detail to some embodiments of the present application, examples of which are illustrated in the accompanying drawings. To facilitate understanding, embodiments are provided under specific network architecture and new service scenarios, such as 3rd generation partnership project (3GPP) 5G, 3GPP long term evolution (LTE), and so on. It is contemplated that along with the developments of network architectures and new service scenarios, all embodiments in the present application are also applicable to similar technical problems; and moreover, the terminologies recited in the present application may change, which should not affect the principle of the present application.

Figure 1:
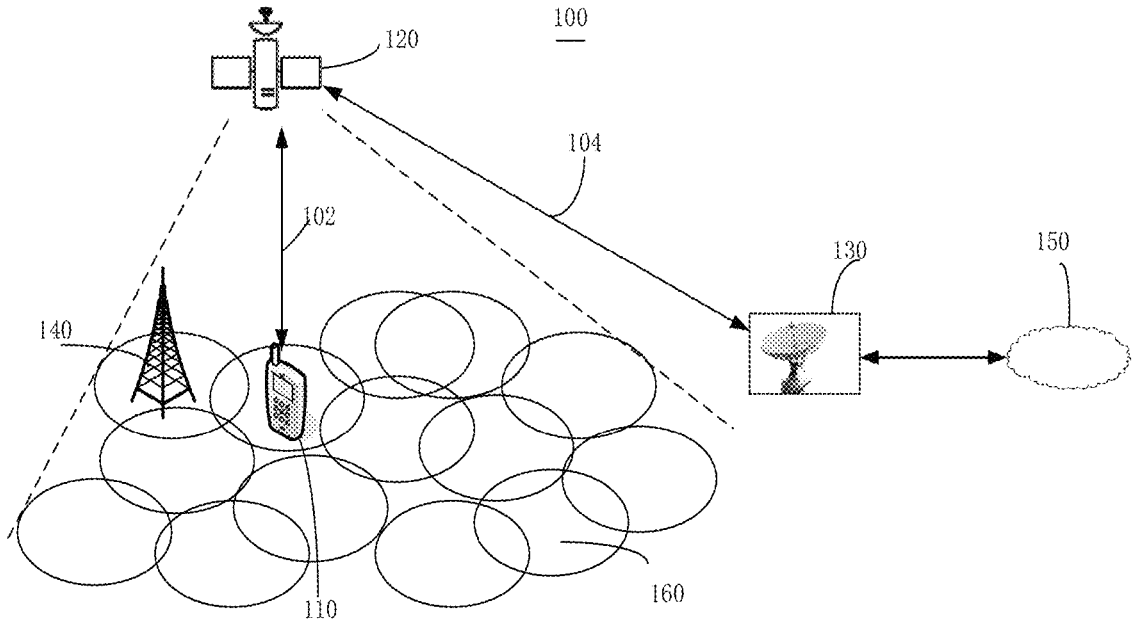
FIG. 1 is a schematic diagram illustrating an exemplary wireless communication system according to some embodiments of the present application.

FIG. 1 is a schematic diagram illustrating an exemplary wireless communication system according to some embodiments of the present application.

Referring to FIG. 1, the shown exemplary wireless communication system is an exemplary NTN network 100 in which the techniques, processes and methods described herein can be implemented, in accordance with various embodiments of the present application. In other embodiments of the present application, the wireless communication system may be other type of networks.

Generally, to extend the coverage and availability of wireless communication systems, some or all functions of a BS may be deployed in a satellite. That is, in the NTN network, a satellite may be also referred to as a BS. For example, a satellite may generate beams over a certain service area, which may also be referred to as a cell coverage area. The concept of cell with respect to a terrestrial BS may similarly apply to a satellite serving as a BS. Such network or segment of network using RF resources on board a satellite or an airborne aircraft may be referred to as an NTN network. Hereafter, the BS(s) illustrated in the specification all cover any type of devices with the substantial function of a BS, including a satellite 120, a terrestrial BS 140 or the like.

As shown in FIG. 1, the NTN network 100 includes at least one UE 110 and at least one satellite 120. The UE(s) 110 communicates with the satellite 120 over a service link 102, which has both an uplink from the UE 101 to the satellite 120 and a downlink from the satellite 120 to the UE 110. The UE(s) 110 may include computing devices, such as desktop computers, laptop computers, personal digital assistants (PDAs), tablet computers, smart televisions (e.g., televisions connected to the Internet), set-top boxes, game consoles, security systems (including security cameras), vehicle on-board computers, network devices (e.g., routers, switches, and modems), internet of things (IoT) devices, or the like. According to some embodiments of the present application, the UE(s) 110 may include a portable wireless communication device, a smart phone, a cellular telephone, a flip phone, a device having a subscriber identity module, a personal computer, a selective call receiver, or any other device that is capable of sending and receiving communication signals on a wireless network. In some embodiments of the present application, the UE(s) 110 includes wearable devices, such as smart watches, fitness bands, optical head-mounted displays, or the like. Moreover, the UE(s) 110 may be referred to as a subscriber unit, a mobile, a mobile station, a user, a terminal, a mobile terminal, a wireless terminal, a fixed terminal, a subscriber station, a user terminal, or a device, or described using other terminology used in the art.

Satellite(s) 120 may include low earth orbiting (LEO) satellites, medium earth orbiting (MEO) satellites, geostationary earth orbiting (GEO) satellites, as well as highly elliptical orbiting (HEO) satellites. In some embodiments of the present application, alternatively, a satellite 120 may be an unmanned aircraft systems (UAS) platform. The UAS platform(s) may include tethered UAS and lighter than air (LTA) UAS, heavier than air (HTA) UAS, and high altitude platform (HAP) UAS.

The satellite 120 may provide a plurality of geographic areas (footprint) 160 for serving UEs 110 located in one or more of the geographic areas. A geographic area 160 can be associated with a cell, and can also be associated with a beam. When the geographic area 160 is associated with a cell, it can be named as a "cell footprint." When the geographic area 160 is associated with a beam, it can be named as a "beam footprint." In FIG. 1, exemplary UE(s) may be a normal mobile terminal, which can wirelessly communicate with the satellite 120 via a communications link, such as service link or radio link in accordance with a NR access technology (e.g., a NR-Uu interface). As also shown in FIG. 1, the satellite 120 may also communicates with a gateway 130 or an on earth (terrestrial) BS 140 via a communication link, which may be a feeder link 102 or radio link in accordance with NR access technologies or other technologies. In accordance with various embodiments, the satellite 120 may be implemented with either a transparent or a regenerative payload. When the satellite 120 carries a "transparent" payload, it performs only radio frequency filtering, frequency conversion and/or amplification of signals on board. Hence, the waveform signal repeated by the satellite is un-changed. When a satellite carries a regenerative payload, in addition to performing radio frequency filtering, frequency conversion and amplification, it performs other signal processing functions such as demodulation/decoding, switching and/or routing, coding/decoding and modulation/demodulation on board as well. In other words, for a satellite with a regenerative payload, all or part of base station functions (e.g., a gNB, eNB, etc.) are implemented on board.

The gateway 130 may be coupled to a data network 150 such as, for example, the Internet, terrestrial public switched telephone network, mobile telephone network, or a private server network, etc. The gateway 130 and the satellite 120 communicate over a feeder link 120, which has both a feeder uplink from the gateway to the satellite 120 and a feeder downlink from the satellite 120 to the gateway 130. Although a single gateway 130 is shown, some implementations will include more gateways, such as five, ten, or more.

One or more terrestrial BS s 140 (i.e., not airborne or spaceborne) are provided within a typical terrestrial communication network, which provides geographical radio coverage, wherein the UEs 110 that can transmit and receive data within the radio coverage (cell coverage) of the terrestrial BS 140. In the terrestrial communication network, a terrestrial BS 140 and a UE 110 can communicate with each other via a communication link, e.g., via a downlink radio frame from the terrestrial BS 140 to the UE 110 or via an uplink radio frame from the UE 110 to the terrestrial BS 140.

Although a limited number of UEs 110 and satellites 120 etc., are illustrated in FIG. 1, it is contemplated that the wireless communication system 100 may include any number of UEs 110, satellites 120, and/or other network components.

A BS (e.g., a satellite 120 or a terrestrial BS 140) may transmit resource configuration information on RS (or RS resource). A RS may be a channel state information-reference signal (CSI-RS), a synchronization signal block (SSB), or a sounding reference signal (SRS) etc., various RS s. In addition, a RS may be associated with a time domain filter, a frequency domain filter, or a spatial domain filter. Each beam (may be represented by spatial relation information) of a BS or UE is associated with a spatial domain transmission or reception filter. From the perspective of a UE, a downlink (DL) beam may be associated with a spatial domain reception filter, and an uplink (UL) beam may be associated with a spatial domain transmission filter.

Moreover, different coverages can be associated with different beams. BWP is introduced in R15, which is a contiguous set of physical resource blocks (PRBs) on a given carrier. These RBs are selected from a contiguous subset of the common resource blocks for a given numerology. Currently, three types of BWP are available: initial BWP, active BWP and default BWP. A UE can be configured with maximum 4 BWPs for downlink and uplink but at a given point of time only one BWP is active for downlink (DL BWP) and one BWP is active for uplink (UL BWP). When an inactivity timer is configured for a serving cell, the expiry of the inactivity timer associated to that cell switches the active BWP to a default BWP configured by the network. When a BWP is switched, a new active BWP has to be determined. In the RACH procedure, the initial BWP will also be determined, and the initial BWP determined in RACH procedure is also the active BWP. In NR legacy release, there is an active DL BWP and an active UL BWP. The active DL BWP is for the reception of at least one of data and RS from UE perspective, and the active UL BWP is for the transmission of at least one of data and RS from UE perspective. Alternatively, there may be two active DL BWPs or two active UL BWPs simultaneously. In this case, one active DL BWP is for reception of CSI-RS (and/or SSB) for beam management from UE perspective, and it can be referred as a common DL BWP. The other active DL BWP is for data and RS for other purpose. For uplink, one active UL BWP is for transmission of SRS for beam management from UE perspective, and it can be referred as a common UL BWP. The other active UL BWP is for data and RS for other purpose.

In legacy technologies, e.g., NR R15 and R16, configuration information on beam indication and BWP switching is separately indicated to the remote side (e.g., the UE side). However, for interference avoidance, different beams may be associated with the same BWP or different BWPs. When beams of a BS are configured to be associated with different BWPs, a UE may need to perform BWP switching between different BWPs to perform measurements such as L1-reference signal receiving power (RSRP) measurement for all beams.

Figure 2:
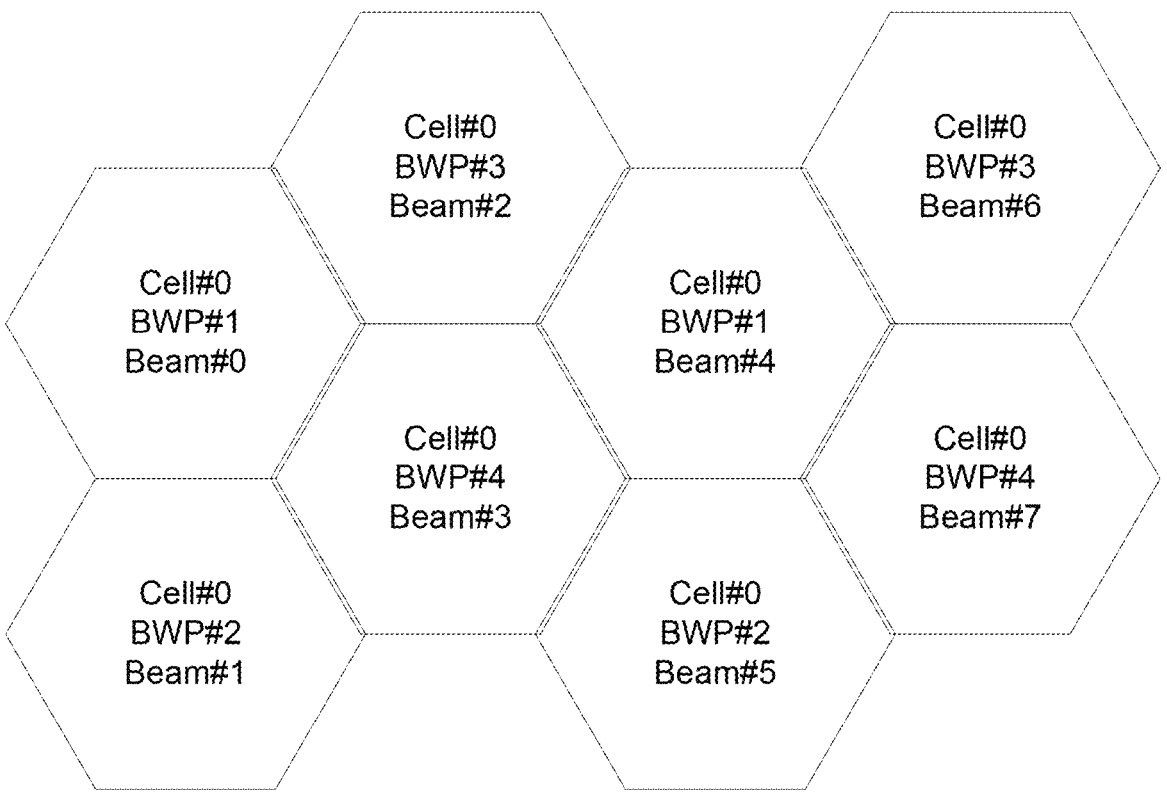
FIG. 2 illustrates a schematic diagram illustrating an association between BWP and beams in an exemplary cell of a BS according to some embodiments of the present application.

FIG. 2 illustrates a schematic diagram illustrating an association between BWP and beams in an exemplary cell of a BS (e.g., a satellite 120) according to some embodiments of the present application. The BS may perform wireless communication with UEs using one or more multiple beams.

As shown in FIG. 2, for a cell, e.g., cell #0, there are a plurality of BWPs, e.g., BWP #1 to BWP #4, and a plurality of beams associated with the plurality of BWPs, e.g., beam #0 to beam #7. Wherein, BWP #1 is associated with beam #0 and beam #4, BWP #2 is associated with beam #1 and beam #5, BWP #3 is associated with beam #2 and beam #6, and BWP #4 is associated with beam #3 and beam #7. It is contemplated that a cell may include any other number of BWPs, e.g., 3 BWPs and each BWP may be associated with any number of beams, e.g., 2 beams in other embodiments of the present application.

However, the association between BWP and beam will be a restriction for the selection of indicated beam and/or BWP, which may be based on PDCCH or medium access control (MAC) control element (CE) configuration. For example, when a UE is scheduled for data transmission and/or data reception on BWP #1, the available beams for BWP #1 would only be beam #0 and beam #4. Apparently, such a restriction on the PDCCH or MAC CE configuration will reduce scheduling flexibility. When the association between BWP and beam is changed, the corresponding configuration also needs to be updated, which will cause large signaling overhead. Similar issues will also happen for the determination of an active BWP when the association between RS (also referred to RS resource, RS transmission etc.) and BWP is considered.

Methods and apparatuses according to embodiments of the present application are proposed to at least solve the above technical problem.

Figure 3:
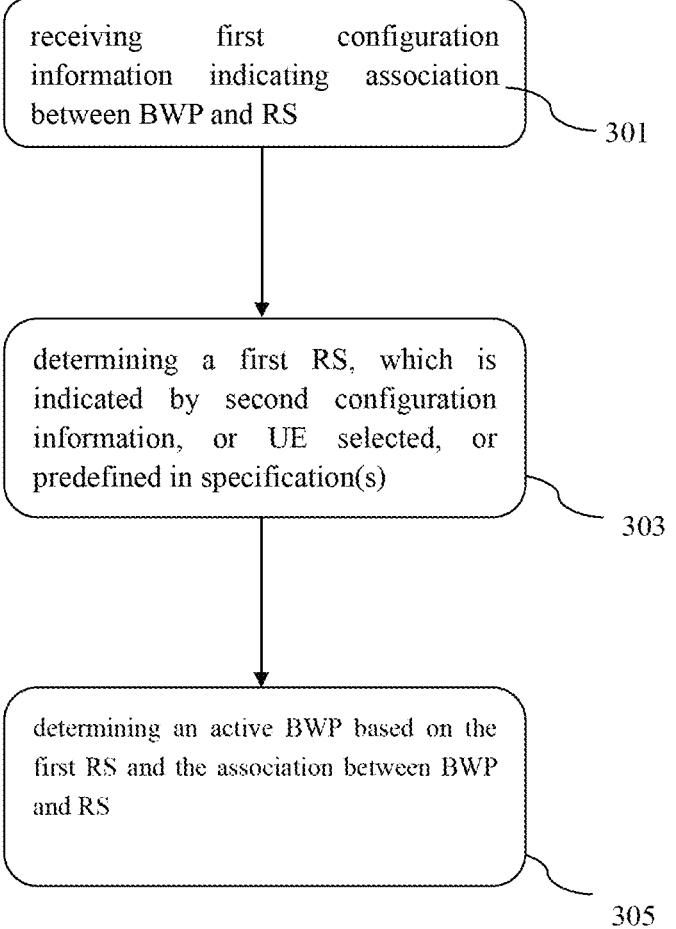
FIG. 3 is a flow chart illustrating an exemplary method for determining an active BWP according to some embodiments of the present application.

FIG. 3 is a flow chart illustrating an exemplary method for determining an active BWP according to an embodiment of the present application, which can be performed in the remote side, e.g., by a UE 110 or the like.

As shown in FIG. 3, in step 301, first configuration information indicating association between BWP and RS may be received, e.g., in the UE 110. In some embodiments of the present application, the first configuration information is received via at least one of broadcast signaling and RRC signaling. An exemplary association between BWP and RS is similar to that between BWP and beams. For example, for a cell, e.g., cell #0, there are one or more BWPs, e.g., BWP #1 to BWP #4, and a plurality of RSs, e.g., CSI-RS #0 to CSI-RS #7 (or other types of RSs) associated with the plurality of BWPs. Wherein, BWP #1 is associated with CSI-RS #0 and CSI-RS #4, BWP #2 is associated with CSI-RS #1 and CSI-RS #5, BWP #3 is associated with CSI-RS #2 and CSI-RS #6, and BWP #4 is associated with CSI-RS #3 and CSI-RS #7.

When only spatial domain filter being considered, the association between BWP and RS may be represented by the association between BWP and beam in view of the association between the RS and beam. For example, the index of a beam can be represented by the index of at least one of SSB, CSI-RS and SRS. The index of RS, e.g., the index of SSB, may be associated with the index of a RS resource or the index of a RS resource set. One of the SSB and CSI-RS is used to associate with DL BWP, and SRS is used to associate with a UL BWP. For the example, referring to the scenario shown in FIG. 2, BWP #1 for DL may be associated SSB #0 (corresponding to beam #0) and SSB #4 (corresponding to beam #4), and meanwhile, BWP #1 for DL is also associated with CSI-RS #0 (corresponding to beam #0) and CSI-RS #4 (corresponding to beam #4). BWP #3 for UL is associated with SRS #2 and SRS #6. Based on the association between BWP and beam, the beam set (corresponding to a RS set) for each BWP can be constructed. For the above example, the beam set (or RS set) for BWP #1 for DL is associated with {SSB #0, SSB #4} or {CSI-RS #0, CSI-RS #4}, and the beam set (or RS set) for BWP #3 for UL is associated with {SRS #2, SRS #6}.

In step 303, a first RS is determined, e.g., in the UE 110. According to some embodiments of the present application, the first RS is associated with one of a CSI-RS, SSB and SRS, and the association between BWP and RS indicates the association between the active BWP and the one of the CSI-RS, the SSB and the SRS.

In some embodiments of the present application, the first RS is indicated by second configuration information via a signaling, e.g., DCI. In some other embodiments of the present application, the first RS may be selected by the UE itself. In some yet other embodiments of the present application, the first RS may be predefined, e.g., in specification(s), which may be one or more 3GPP specifications (or protocols). For example, the first RS may be predefined to be a RS with respect to parameter(s) used for PDCCH reception of a control resource set (CORESET) with the lowest index. In another example, the first RS may be predefined to be a RS with respect to an activated transmission configuration indication (TCI) state with the lowest index applicable to PDSCH. In yet another example, the first RS may be predefined to be a RS associated with a dedicated PUCCH resource with the lowest index.

Based on the first RS and the association between BWP and RS, an active BWP may be further determined in step 305. The active BWP may be an active DL BWP (or DL BWP) for PDCCH monitoring, an active DL BWP for PDSCH reception, an active UL BWP (or UL BWP) for PUSCH transmission, or an active BWP for PRACH transmission etc.

The determination of the active BWP can be performed in various manners in view of various scenarios. For example, in some embodiments of the present application, the first RS is at least one aperiodic SRS triggered by DCI, which associated with one of a CSI-RS and SSB, and the association between BWP and RS indicates the association between the active BWP and the one of the CSI-RS and the SSB. In some other embodiments of the present application, the first RS is at least one aperiodic SRS triggered by DCI the association between BWP and RS indicates the association between the active BWP and the first RS. In some other embodiments of the present application, the first RS is SSB indicated by PDCCH order, and the association between BWP and RS indicates the association between the active BWP and the SSB. In some yet other embodiments of the present application, the first RS is UE selected SSB for determining RO for PRACH transmission, and the association between BWP and RS indicates the association between the active BWP and the SSB. In some yet other embodiments of the present application, the first RS is associated with a candidate RS during a BFR procedure. The candidate RS is one of a CSI-RS and SSB, and the association between BWP and RS indicates the association between the active BWP and the one of the CSI-RS and the SSB. More details on the determination of the active BWP, e.g., determining an index of the active BWP will be illustrated in the following text.

Figure 4:
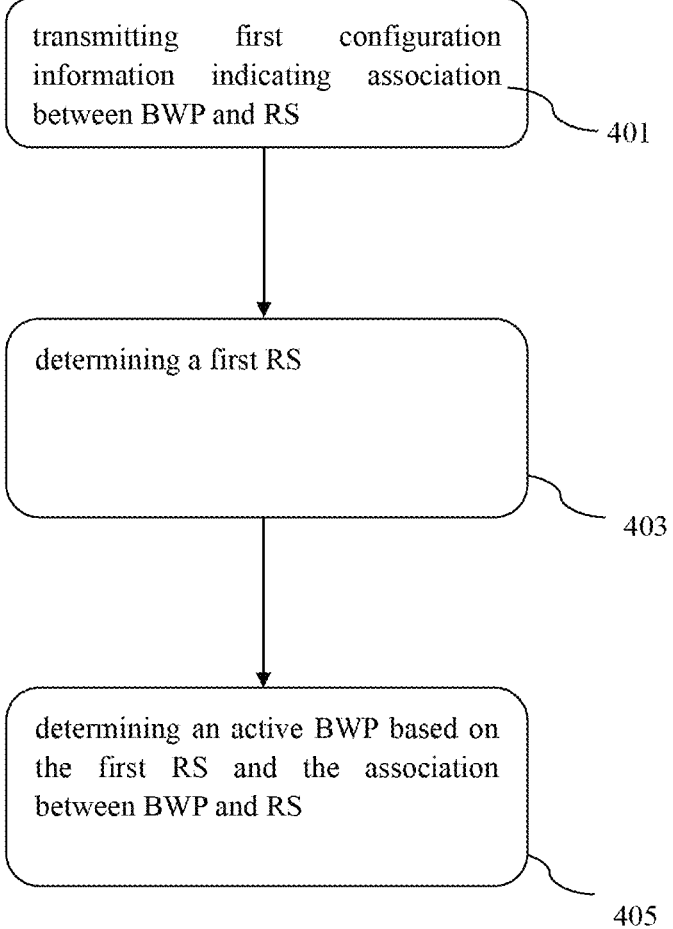
FIG. 4 is a flow chart illustrating an exemplary method for determining an active BWP according to some other embodiments of the present application.

On the network side, a similar procedure can be performed. For example, FIG. 4 is a flow chart illustrating an exemplary method for determining an active BWP according to some other embodiments of the present application, which can be performed in the network side, e.g., by a BS or the like. Considering the consistency between the network side and UE side, the exemplary procedure will be briefly illustrated in the network side.

As shown in FIG. 4, in step 401, first configuration information indicating association between BWP and RS may be transmitted, e.g., from a BS (e.g., a satellite 120). The first configuration information may be transmitted via a broadcast signaling or RRC signaling.

In step 403, a first RS is determined, e.g., in the BS. In some embodiments of the present application, the network side determines the first RS and the first RS will be transmitted by second configuration information, e.g., DCI. In some other embodiments of the present application, the first RS is selected by a UE. For example, the first RS is a UE selected SSB for determining RO for PRACH transmission. In some other embodiments of the present application, the first RS associated with the first BWP may be predefined in specification(s). For example, the first RS may be predefined to be a RS with respect to parameter(s) used for PDCCH reception of a CORESET with a lowest index. In another example, the first RS may be predefined to be a RS with respect to an activated TCI state with a lowest index applicable to PDSCH. In yet another example, the first RS may be predefined to be a RS associated with a dedicated PUCCH resource with a lowest index.

Based on the first RS and the association between BWP and RS, an active BWP may be further determined in step 405. For example, the active BWP may be an active DL BWP for PDCCH monitoring, an active DL BWP for PDSCH reception, an active UL BWP for PUSCH transmission, or an active BWP for PRACH transmission etc. The determination of the second RS associated with the first BWP can be performed in various manners, which should be consistent with that in the remote side.

Based on the above basic solutions, more details will be illustrated in various embodiments in view of various application scenarios hereafter. Persons skilled in the art should understand that although some specific embodiments based on the basic are illustrated in view of specific scenarios, the illustrated solutions may also be applicable to some other scenarios and should not be limited to the specific scenarios.

BWP Switching for SRS Transmission

In an exemplary scenario, at least one SRS, e.g., a SRS resource set configured with usage "antennaSwitching" and triggered by "SRS request" in DCI is to be transmitted in a UL BWP with an index associated with the spatialRelation-Info (representing a beam) configured for the SRS resource set. In some embodiments of the present application, the spatialRelationInfo can be configured with at least one of CSI-RS index, SSB index, SRS index, and DL position reference signal (PRS) index. For example, the spatialRelationInfo can be configured with indexes of CSI-RS and SSB. A UE may be configured with at least one SRS resource set which is to be transmitted in a UL BWP different from the current active UL BWP. In this case, a UE may be configured with multiple SRS resource sets for a first UL BWP. A first SRS resource set is to be transmitted in the first UL BWP, and a second SRS resource sets are to be transmitted in a second UL BWP different from the first UL BWP, and so on. For the second SRS resource set, although the corresponding configuration signaling is associated with the first UL BWP, the parameter setting, e.g. frequency domain resource of the second SRS resource set will consider the second UL BWP's configuration on at least one SCS, circle prefix (CP) and bandwidth. Similar mechanisms can be applied for other SRS resources sets bases on the spatial relation Info of the corresponding SRS resource set.

For example, the first RS is at least one aperiodic SRS triggered by DCI in this exemplary scenario. According to some embodiments of the present application, the first RS is associated with one of a CSI-RS and SSB, and the association between BWP and RS indicates the association between the active BWP and the one of the CSI-RS and the SSB. For example, a DL BWP can be determined based on the association between DL BWP and one of the CSI-RS and SSB, and the association between the first RS, i.e., the indicated SRS and the corresponding one of CSI-RS and SSB. In some embodiments of the present application, a UL BWP for SRS transmission can further be determined based on the association between DL BWP and UL BWP, e.g., the UL BWP and the DL BWP being configured to have the same index or the relationship between DL BWP and UL BWP can be configured by signaling. For example, an exemplary association relationship between SSB/CSI-RS index and BWP index in FIG. 2 may be represented as: {BWP #1, SSB #0, SSB #4, CSI-RS resource #0, CSI-RS resource #4}, {BWP #2, SSB #1, SSB #5, CSI-RS resource #1, CSI-RS resource #5}, {BWP #3, SSB #2, SSB #6, CSI-RS resource #2, CSI-RS resource #6}, and {BWP #4, SSB #3, SSB #7, CSI-RS resource #3, CSI-RS resource #7}. Under this association relationship, when the spatialRelationInfo for a SRS resource set for antenna switching and triggered by DCI is configured with CSI-RS resource #2, the corresponding UL BWP index, i.e., the index of the active BWP is BWP #3; and when the spatialRelationInfo for a SRS resource set for BWP switching and triggered by DCI is configured with SSB #4, the corresponding UL BWP index, i.e., the index of the active BWP is BWP #1.

According to some other embodiments of the present application, when the first RS is at least one aperiodic SRS triggered by DCI, and the association indicates the association between BWP and the first RS, a BWP can be directly determined based on the first RS and the association between BWP and the first RS. The firstly determined BWP is a UL BWP. For example, an exemplary association relationship between SRS index and BWP index in FIG. 2 may be represented as: {BWP #1, SRS resource set #0, SRS resource set #4}, {BWP #2, SRS resource set #1, SRS resource set #5}, {BWP #3, SRS resource set #2, SRS resource set #6}, and {BWP #4, SRS resource set #3, SRS resource set #7}. Under this association relationship, when the triggered SRS resource set is SRS resource set #2, the corresponding UL BWP index, i.e., the index of the active BWP is BWP #3; and when the indicated SRS resource set SRS resource set #4, the corresponding UL BWP index, i.e., the index of the active BWP is BWP #1.

A time domain offset between the DCI and transmission of the at least one aperiodic SRS based on SCS of the active BWP may also be determined in some embodiments of the present application. The time domain offset may also consider the BWP switching delay such that the time domain offset is larger than the BWP switching delay.

In some other embodiments of the present application, a minimal time interval between a last symbol of a PDCCH including the DCI triggering the at least one aperiodic SRS and a first symbol of a first SRS of the at least one aperiodic SRS is also determined based on the SCS of the active BWP. The minimal time interval may also consider the BWP switching delay such that the minimal time interval is larger than the BWP switching delay.

For example, an exemplary association relationship between SSB/CSI-RS index and BWP index in FIG. 2 may be represented as: {BWP #1, SSB #0, SSB #4, CSI-RS resource #0, CSI-RS resource #4}, {BWP #2, SSB #1, SSB #5, CSI-RS resource #1, CSI-RS resource #5}, {BWP #3, SSB #2, SSB #6, CSI-RS resource #2, CSI-RS resource #6}, and {BWP #4, SSB #3, SSB #7, CSI-RS resource #3, CSI-RS resource #7}. BWP #1 configured with SCS 30 KHz, BWP #2 configured with SCS and BWP #3 configured with SCS 15 KHz are configured for a UE. Meanwhile, both SRS resource set #1 with spatialRelationInfo configured to be CSI-RS #0 and SRS resource set #2 with spatialRelationInfo configured to be SSB #1 are configured at BWP #3 by a RRC signaling. SRS resource set #1 includes SRS resource #0 and SRS resource #1. SRS resource set #2 includes SRS resource #2 and SRS resource #3. When SRS resource set #1 is triggered by downlink DCI, uplink DCI or a group common DCI, the UL BWP for SRS transmission is BWP #1 based on the exemplary association relationship. The active BWP for the aperiodic SRS transmission is BWP #1. The SCS used to determine the minimal time interval and the time domain offset is SCS 30 KHz, which is the SCS of BWP #1. When SRS resource set #2 is triggered by a downlink DCI, uplink DCI or a group common DCI, the UL BWP for SRS transmission is UL BWP #2 based on the exemplary association relationship. The active BWP for the aperiodic SRS transmission is BWP #2. The SCS to determine the minimal time interval and the time domain offset is SCS 60 KHz, which is the SCS of BWP #2.

BWP Switching for RACH Procedure

According to some embodiments of the present application, an exemplary RACH procedure may be a RACH procedure (or PRACH) triggered by PDCCH order, a 4-step RACH procedure (i.e., a PRACH procedure), or a 2-step RACH procedure. The determined active BWP can be used as at least one of UL BWP and DL BWP. After the preamble transmission in a RACH procedure, PDCCH and corresponding PDSCH can be transmitted on a determined DL BWP from the network side and can be monitored on the determined DL BWP in the remote side. PUCCH for received PDSCH may be transmitted on a determined UL BWP by the remote side, and received in the network side.

For a RACH procedure triggered by PDCCH order, the first RS is SSB indicated by PDCCH order, and the association between BWP and RS indicates the association between the active BWP and the SSB. For example, from the UE perspective, the index of an active UL BWP can be determined based on the association between the index of an indicated SSB and the index of UL BWP. Alternatively, an active DL BWP index is determined based on the association between the index of an indicated SSB and the index of DL BWP, and the active UL BWP can further be determined based on the association between DL BWP and UL BWP, e.g., the UL BWP and the DL BWP being configured to have the same index or the relationship between DL BWP and UL BWP can be configured by signaling. Similarly, the index of a DL BWP, i.e., the active BWP as DL BWP can be determined based on the association between the index of an indicated SSB and the index of DL BWP.

According to some embodiments of the present application, from the UE perspective, at least one of Msg 1, Msg 3 and PUCCH may be transmitted on the determined active BWP in the case of the active BWP being UL BWP. Considering the consistency between the UE side and BS side, from the BS perspective, Msg 1, Msg 3 and PUCCH may be received on the determined active BWP in the case of the active BWP being UL BWP. In another example, from the UE perspective, the PDCCH and corresponding PDSCH scheduled by the PDCCH may be monitored on the active BWP in the case of the active BWP being DL BWP. While from the BS perspective, the PDCCH and corresponding PDSCH scheduled by the PDCCH may be transmitted on the active BWP in the case of the active BWP being DL BWP.

For a 4-step RACH procedure and a 2-setp RACH procedure, the first RS may be UE selected SSB for determining RO for PRACH transmission, and the association between BWP and RS indicates the association between the active BWP and the SSB in some embodiments of the present application. For example, a UE may select a SSB based on at least one of RSRP, reference signal receiving quality (RSRQ) and signal to interference plus noise ratio (SINR) measurement. An active BWP can be determined based on the association between SSB and BWP, e.g., an index of a SSB being associated with an index of a BWP.

For example, a UL BWP can be determined in several steps or in a single step based on the corresponding association between SSB and UL BWP according to the configuration information. The determined UL BWP can be used for at least one PRACH, PUCCH and PUSCH of Msg 1, Msg 3 and Msg A. The DL BWP can also be determined in several steps or in a single step based on the corresponding association between SSB and DL BWP according to configuration information. The determined DL BWP can be used for at least one of PDCCH and PDSCH of Msg 2, Msg 4 and Msg B.

For another example, whether the active BWP can be a UL BWP for PRACH transmission is determined based on whether there is RACH resource configuration on the active BWP. In the case that there is RACH resource configuration, the UE can transmit the PRACH transmission on the active BWP as UL BWP, and the BS may receive the PRACH transmission on the active BWP as UL BWP. In some embodiments of the present application, in the case that there is RACH resource configuration, the UE may transmit PUSCH and PUCCH on the active BWP as UL BWP, and the BS may receive PUSCH and PUCCH on the active BWP as UL BWP. In the case that there is no RACH resource configuration, the UE can transmit the PRACH transmission on a common UL BWP different from the active BWP, and the BS can receive the PRACH transmission on the common UL BWP. According to some embodiments of the present application, the common UL BWP can be used for SRS transmission for beam management.

In another example, whether the active BWP can be a DL BWP for PDCCH monitoring is determined based on whether there is RACH resource configuration on an associated uplink active BWP which has the same index as the active DL BWP or the relationship between DL BWP and UL BWP can be configured by signaling. In the case that there is RACH resource configuration on the corresponding active UL BWP, the BS may transmit the PDCCH and PDSCH on the active BWP as DL BWP which has the same index as the active UL BWP or is based on the relationship between DL BWP and UL BWP configured by signaling, and the UE may monitor the PDCCH and PDSCH on the active BWP as DL BWP. In the case that there is no RACH resource configuration, the BS may transmit the PDCCH on a common DL BWP different from the active DL BWP, and the UE may monitor the PDCCH on the common DL BWP. According to some embodiments of the present application, the common DL BWP may be used for CSI-RS transmission for beam management.

For example, in an exemplary 4-step RACH procedure according to some embodiments of the present application, a UE may select a SSB index based on at least one of RSRP, RSRQ and SINR measurement. The UE may determine a UL active BWP index based on the association between SSB index and UL BWP index according to configuration information, that is, the UL active BWP is determined. The UE may also determine a DL active BWP index based on the association between SSB index and DL BWP index according to configuration information. Alternatively, the DL BWP index is the same as the UL BWP index or the relationship between DL BWP and UL BWP is configured by signaling, that is, the DL active BWP is determined. The UE can transmit Msg 1 to the BS on the determined UL active BWP in step 1 of the 4-step RACH procedure. The BS may perform blind detection on all possible UL BWPs. After preamble detection, the BS can identify the UL active BWP and then identify the SSB associated with the UL active BWP based on the association between SSB and BWP. Based on the determined SSB, the BS can also determine the DL BWP associated with the selected SSB based on the association between SSB and DL BWP. In some other embodiments of the present application, the BS can also determine the DL BWP associated with the selected SSB based on the association between SSB and UL BWP index and the same index for DL BWP and UL BWP or the relationship between DL BWP and UL BWP configured by signaling.

According to some embodiments of the present application, the UE may select a SSB, and determine whether the BWP associated the selected SSB can be used as UL BWP for PRACH transmission based on whether there is RACH resource configuration. When there is RACH resource configuration, the UE can transmit the PRACH transmission on the active BWP as UL BWP, and the BS may receive the PRACH transmission on the active BWP as UL BWP. Otherwise, the UE can transmit the PRACH transmission on a common BWP different the UL BWP associated with the SSB index, and the BS may receive the PRACH transmission on the common BWP, e.g., a BWP used for SRS transmission for beam management.

According to some other embodiments of the present application, the UE may determine whether the BWP associated the selected SSB can be used as DL BWP for downlink transmission (e.g. PDCCH or PDSCH) based on whether there is RACH resource configuration. When there is RACH resource configuration, the BS may transmit the downlink transmission (e.g. Msg 2, Msg 4 or Msg B) on the active BWP as DL BWP, and the UE may receive the downlink transmission on the active BWP as DL BWP. Otherwise, the BS can transmit the downlink channel or RS on a common BWP different the DL BWP associated with the SSB index, and the UE may receive the downlink transmission on the common BWP, e.g., a BWP used for CSI-RS transmission for beam management.

In step 2 of the exemplary 4-step RACH procedure, the BS may transmit Msg 2 on the DL BWP associated with the SSB detected from preamble detection. The UE will monitor Msg 2 in the corresponding DL BWP.

In step 3 of the exemplary 4-step RACH procedure, the UE may transmit Msg 3 on the same UL BWP as that for Msg 1 transmission.

In step 4 of the exemplary 4-step RACH procedure, the BS may transmit Msg 4 on the DL BWP associated with the SSB detected from preamble detection, which is as the same as that for Msg 2 transmission. The UE will monitor Msg 4 in the corresponding DL BWP.

In an exemplary 2-step RACH procedure according to some embodiments of the present application, a UE may select a SSB index based on at least one of RSRP, RSRQ and SINR measurement. The UE and BS may determine an active UL BWP and active DL BWP in the same way as those illustrated in 4-step RACH procedure, and thus the specific determination will not repeat herein. The UE can transmit Msg A to the BS in the determined UL active BWP, while the BS can receive Msg A from the UE in the determined UL active BWP in step 1 of the exemplary 2-step RACH procedure. In step 2 of the exemplary 2-step RACH procedure, the BS can transmit Msg B to the UE in the determined DL active BWP, while the UE can receive Msg B from the BS in the determined DL active BWP.

BWP Switching for BFR Procedure

According to some embodiments of the present application, during a BFR procedure, the first RS is associated with a candidate RS. The candidate RS is one of a CSI-RS and SSB, and the association between BWP and RS indicates the association between the active BWP and the one of the CSI-RS and the SSB.

The BFR procedure may be at least one of a BFR based on PRACH and a BFR based on PUCCH. After the preamble transmission in a RACH procedure, PDCCH and corresponding PDSCH is transmitted from the BS on the determined active DL BWP, and is received by the UE. PUCCH for received PDSCH is transmitted on the determined active UL BWP. For a BFR based on PUCCH, a PUCCH is transmitted firstly, then a PUSCH providing a candidate beam, e.g., a SSB index or a CSI-RS resource index) is transmitted, and then PDCCH using the provided candidate beam will be monitored. When a determined BWP is a UL BWP, at least one of PRACH, PUSCH and PUCCH can be transmitted, e.g., by a UE, and received, e.g., by a BS on the active UL BWP. When a determined BWP is a DL BWP, PDCCH and corresponding PDSCH scheduled by the PDCCH can be transmitted, by a BS, and is monitored, e.g., by a UE on the active DL BWP.

According to some embodiments of the present application, whether the active BWP can be UL BWP for PRACH transmission can be determined based on whether there is RACH resource configuration on the active UL BWP. In the case that there is RACH resource configuration, the PRACH transmission is transmitted on the active BWP as UL BWP. PUSCH and PUCCH can also be transmitted on the active BWP as UL BWP. In the case that there is no RACH resource configuration, the PRACH transmission is transmitted on a common UL BWP different from the active BWP, e.g., a common UL BWP used for SRS transmission for beam management.

According to some other embodiments of the present application, whether the active BWP as DL BWP for PDCCH monitoring can be determined based on there is PRACH resource configuration on an associated uplink active BWP. In the case that there is RACH resource configuration, the PDCCH and PDSCH are monitored on the active BWP as DL BWP. In some embodiments of the present application, PDCCH and corresponding PDSCH scheduled by the PDCCH can be monitored on the active BWP being DL BWP. In the case that there is no RACH resource configuration, the PDCCH can be monitored on a common DL BWP different from the active BWP, e.g., a common DL BWP used for CSI-RS transmission for beam management.

Besides the solution disclosed in the above, some embodiments of the present application also propose other solutions for determining active BWP. For example, according to some embodiments of the present application, CSI-RS report configuration index can be used to determine a DL BWP.

Figure 5:
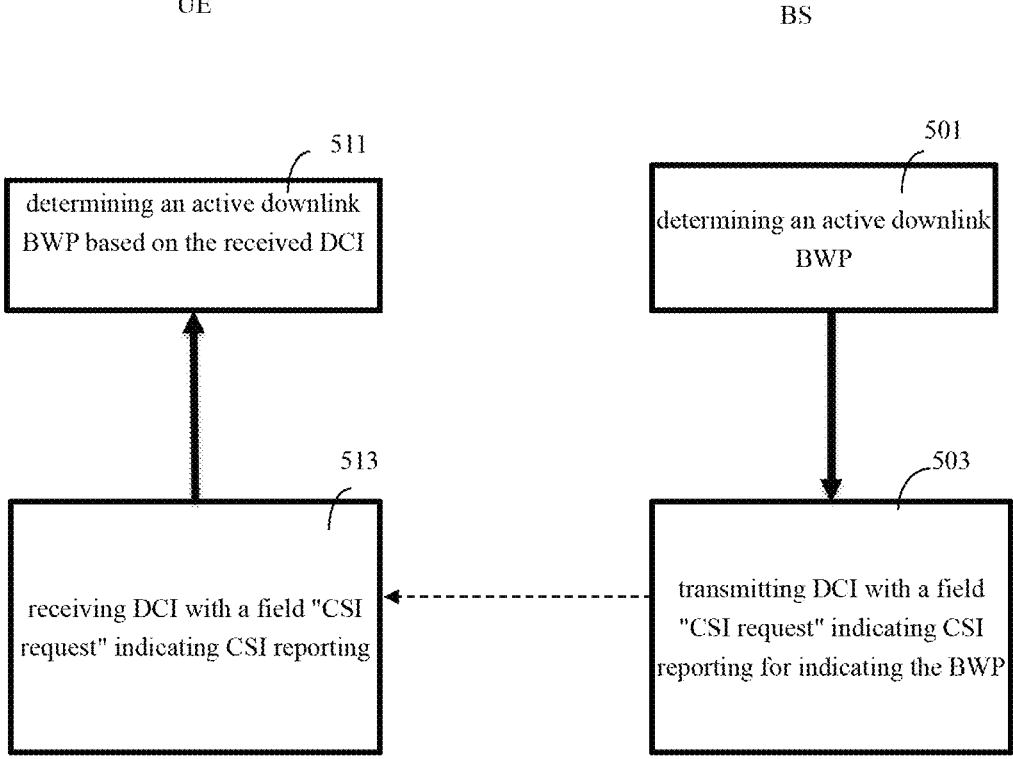
FIG. 5 is a flow chart illustrating an exemplary method for determining an active BWP according to some yet other embodiments of the present application.

FIG. 5 is a flow chart illustrating an exemplary method for determining an active BWP according to some yet other embodiments of the present application. Although the method is illustrated in a system level by a UE in the remote side and a BS in network side (e.g., the UE 110, and the satellite 120 as illustrated and shown in FIG. 1), persons skilled in the art can understand that the method implemented in the remote side and that implemented in the network side can be separately implemented and incorporated by other apparatus with the like functions.

As shown in FIG. 5, in step 501, a DL BWP may be determined in the network side. In some embodiments of the present application, the CSI request field in DCI can trigger aperiodic CSI reporting and aperiodic CSI-RS transmission. A codepoint in DCI is associated with a CSI report configuration index, e.g., a CSI report config ID. A CSI report configuration index is also associated with a CSI resource configuration index, e.g., a CSI resource config ID, and also associated with a DL BWP index. Accordingly, the network side may determine CSI resource configuration based on the active BWP, determine a CSI report index associated with CSI resource configuration, and then determine a CSI request indicated in the field "CSI request" associated with the CSI report index. For example, the index of the DL BWP can be indicated by a CSI request of the DCI. Accordingly, the network side may indicate the DL BWP by indicating CSI reporting via transmitting the DCI with a field "CSI request" in step 503 so that the UE can determine the active DL BWP to locate the corresponding aperiodic CSI resource.

Consistently, the remote side may receive the DCI with a field "CSI request" indicating CSI reporting in step 511. In step 513, the UE may determine an active DL BWP based on the received DCI. For example, the UE may determine a CSI report index associated with a CSI request indicated in the field "CSI request," determine CSI resource configuration associated with the CSI report index, and determine the active BWP based on the CSI resource configuration. The active BWP can be an active DL BWP.

According to some other embodiments of the present application, the purpose of RS can also be used to determine an active BWP, e.g., an active UL BWP or an active DL BWP. For example, a CSI-RS may be configured for beam management or other purposes, e.g., for at least time frequency tracking or CSI measurement and reporting. A SRS resource set may be configured for beam management, or other purpose, e.g., for antenna switching.

Figure 6:
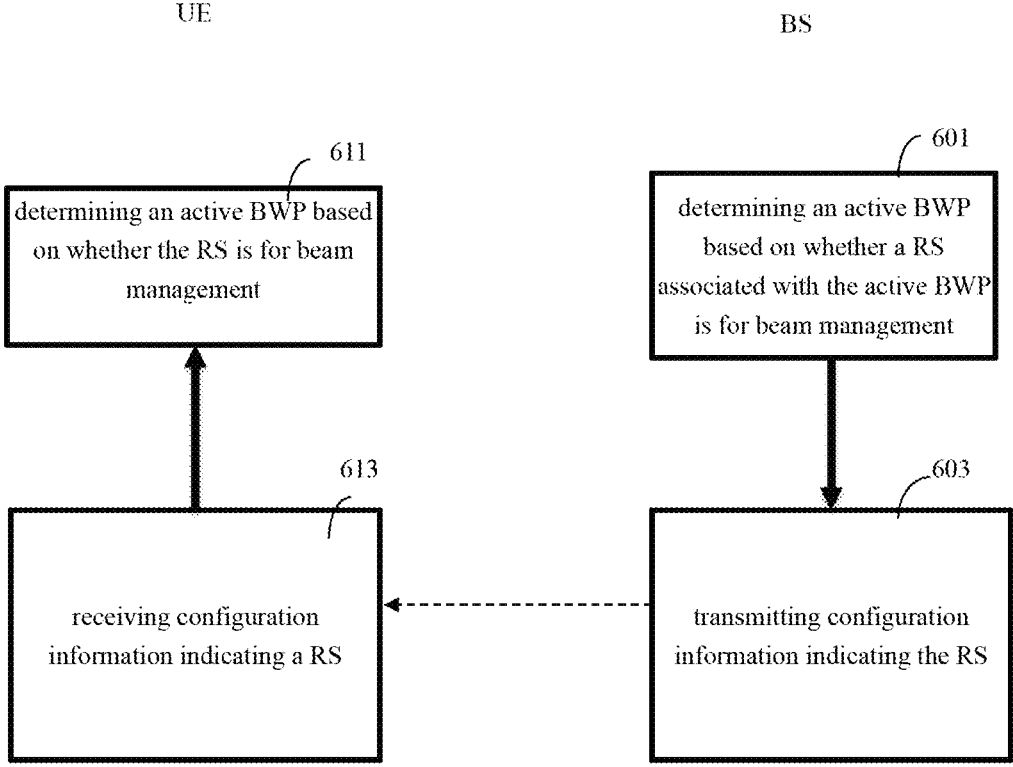
FIG. 6 is a flow chart illustrating an exemplary method for determining an active BWP according to some yet other embodiments of the present application.

FIG. 6 is a flow chart illustrating an exemplary method for determining an active BWP according to some yet other embodiments of the present application. Although the method is illustrated in a system level by a UE in the remote side and a BS in network side (e.g., the UE 110 and the satellite 120 as illustrated and shown in FIG. 1), persons skilled in the art can understand that the method implemented in the remote side and that implemented in the network side can be separately implemented and incorporated by other apparatus with the like functions.

As shown in FIG. 6, in step 601, in the network side, an active BWP is determined based on whether a RS is for beam management in step 601. For example, in the case that the RS is for beam management, the active BWP can be determined as a BWP preconfigured by broadcast or RRC signaling or predefined in specification(s). In the case that the RS is not for beam management, the active BWP can be determined based on information associated with the RS, which may be the same way as that illustrated in embodiments concerning the basic solution shown in FIG. 3, e.g., for determining UL BWP for SRS transmission based on the association between BWP and one of CSI-RS, SSB and SRS.

According to some embodiments of the present application, when the RS is CSI-RS, whether the RS is for beam management is determined based on parameters "repetition" and "TRS-info." For example, for a CSI-RS for beam management, the parameter "repetition" is configured and the parameter "trs-Info" is not configured, and the report metric is at least one of "cri-RSRP" and "cri-SINR." When the RS is SRS, whether the RS is for beam management is determined based on parameter "usage." For example, for a SRS resource set for beam management, the parameter "usage" is configured to be "beamManagement." For a SRS resource set for other purpose, e.g., for antenna switching, the parameter "usage" is configured to be "antennaSwitching." In step 603, configuration information indicating the RS can be transmitted from the network side to the remote side.

Consistently, the remote side may receive configuration information indicating a RS in step 611. In step 613, the UE may determine an active DL BWP based on whether the RS is for beam management. The determination manner is consistent with the BS side.

Embodiments of the present application also propose an apparatus for determining RS or an apparatus for determining an active BWP. For example, FIG. 7 illustrates a block diagram of an apparatus 700 for determining an active BWP according to some embodiments of the present application.

Figure 7:
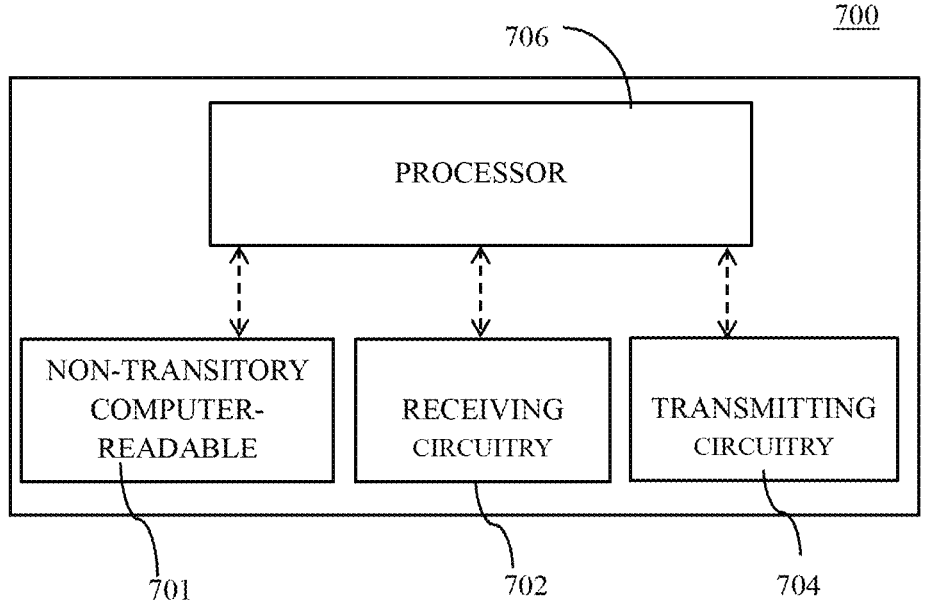
FIG. 7 illustrates a block diagram of an exemplary apparatus according to some embodiments of the present application.

As shown in FIG. 7, the apparatus 700 may include at least one non-transitory computer-readable medium 701, at least one receiving circuitry 702, at least one transmitting circuitry 704, and at least one processor 706 coupled to the non-transitory computer-readable medium 701, the receiving circuitry 702 and the transmitting circuitry 704. The apparatus 700 may be a network side apparatus (e.g., a BS) configured to perform a method illustrated in FIG. 4, FIG. 5, FIG. 6, or the like, or a remote unit (e.g., a UE) configured to perform a method illustrated in FIG. 3, FIG. 5, FIG. 6 or the like.

Although in this figure, elements such as the at least one processor 706, transmitting circuitry 704, and receiving circuitry 702 are described in the singular, the plural is contemplated unless a limitation to the singular is explicitly stated. In some embodiments of the present application, the receiving circuitry 702 and the transmitting circuitry 704 can be combined into a single device, such as a transceiver. In certain embodiments of the present application, the apparatus 700 may further include an input device, a memory, and/or other components.

For example, in some embodiments of the present application, the non-transitory computer-readable medium 701 may have stored thereon computer-executable instructions to cause a processor to implement the method with respect to the UE as described above. For example, the computer-executable instructions, when executed, cause the processor 706 interacting with receiving circuitry 702 and transmitting circuitry 704, so as to perform the steps with respect to the UE depicted in FIG. 3, or FIG. 5, or FIG. 6.

In some embodiments of the present application, the non-transitory computer-readable medium 701 may have stored thereon computer-executable instructions to cause a processor to implement the method with respect to the BS as described above. For example, the computer-executable instructions, when executed, cause the processor 706 interacting with receiving circuitry 702 and transmitting circuitry 704, so as to perform the steps with respect to the BS depicted in FIG. 4, or FIG. 5, or FIG. 6.

The method according to embodiments of the present application can also be implemented on a programmed processor. However, the controllers, flowcharts, and modules may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device on which resides a finite state machine capable of implementing the flowcharts shown in the figures may be used to implement the processor functions of this application. For example, an embodiment of the present application provides an apparatus for determining an active BWP, including a processor and a memory. Computer programmable instructions for implementing a method are stored in the memory, and the processor is configured to perform the computer programmable instructions to implement the method. The method may be a method as stated above or other method according to an embodiment of the present application.

An alternative embodiment preferably implements the methods according to embodiments of the present application in a non-transitory, computer-readable storage medium storing computer programmable instructions. The instructions are preferably executed by computer-executable components preferably integrated with a network security system. The non-transitory, computer-readable storage medium may be stored on any suitable computer readable media such as RAMs, ROMs, flash memory, EEPROMs, optical storage devices (CD or DVD), hard drives, floppy drives, or any suitable device. The computer-executable component is preferably a processor but the instructions may alternatively or additionally be executed by any suitable dedicated hardware device. For example, an embodiment of the present application provides a non-transitory, computer-readable storage medium having computer programmable instructions stored therein. The computer programmable instructions are configured to implement a method as stated above or other method according to an embodiment of the present application.

In addition, in this disclosure, relational terms such as "first," "second," and the like may be used solely to distinguish one entity or action from another entity or action without necessarily requiring or implying any actual such relationship or order between such entities or actions. The terms "includes," "including," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that comprises the element. Also, the term "another" is defined as at least a second or more.

While this disclosure has been described with specific embodiments thereof, it is evident that many alternatives, modifications, and variations may be apparent to those skilled in the art. For example, various components of the embodiments may be interchanged, added, or substituted in the other embodiments. Also, all of the elements of each figure are not necessary for the operation of the disclosed embodiments. For example, one of ordinary skill in the art of the disclosed embodiments would be enabled to make and use the teachings of the disclosure by simply employing the elements of the independent claims. Accordingly, embodiments of the disclosure as set forth herein are intended to be illustrative, not limiting. Various changes may be made without departing from the spirit and scope of the disclosure.

What is claimed is:

1. A method performed by an apparatus, the method comprising:
    receiving first configuration information indicating an association between a bandwidth part (BWP) and a reference signal (RS);
    determining a first RS, which is indicated by second configuration information, is user equipment (UE) selected, or is predefined in one or more specifications, wherein the first RS is a synchronization signal block (SSB) indicated by a physical downlink control channel (PDCCH) order; and
    determining an active BWP based on the first RS and the association between the BWP and the RS, wherein the association between the BWP and the RS indicates an association between the active BWP and the SSB.

2. The method of claim 1, wherein the first RS is at least one aperiodic sounding reference signal (SRS) triggered by downlink control information (DCI).

3. The method of claim 2, wherein the first RS is associated with channel state information (CSI)-RS, and the association between the BWP and the RS indicates the association between the active BWP and the CSI-RS.

4. The method of claim 2, further comprising: determining a time domain offset between the DCI and transmission of the at least one aperiodic SRS based on a subcarrier spacing (SCS) of the active BWP.

5. The method of claim 2, wherein a minimal time interval between a last symbol of a physical downlink control channel (PDCCH) including the DCI and a first symbol of a first SRS of the at least one aperiodic SRS is determined based on a subcarrier spacing (SCS) of the active BWP.

6. The method of claim 2, wherein the association between the BWP and the RS indicates the association between the active BWP and the first RS.

7. The method of claim 1, further comprising: transmitting at least one of Msg 1, Msg 3, and a physical uplink control channel (PUCCH) on the active BWP when the active BWP is an uplink BWP.

8. The method of claim 1, further comprising: monitoring physical downlink control channel (PDCCH) and corresponding physical downlink shared channel (PDSCH) scheduled by the PDCCH on the active BWP when the active BWP is a downlink BWP.

9. The method of claim 1, wherein the first RS is a UE selected synchronization signal block (SSB) for determining a random access channel (RACH) occasion (RO) for a physical random access channel (PRACH) transmission, and the association between the BWP and the RS indicates the association between the active BWP and the UE selected SSB.

10. The method of claim 9, further comprising: determining whether the active BWP is an uplink BWP for PRACH transmission based on whether there is a RACH resource configuration on the active BWP.

11. The method of claim 10, further comprising: when there is RACH resource configuration, transmitting the PRACH transmission on the active BWP as an uplink BWP; and when there is no RACH resource configuration, transmitting the PRACH transmission on a common uplink BWP different from the active BWP.

12. The method of claim 1, wherein the first RS is associated with a candidate RS during a backhaul failure recovery (BFR) procedure.

13. The method of claim 12, wherein the candidate RS is a channel state information (CSI)-RS or a synchronization signal block (SSB), and the association between the BWP and the RS indicates the association between the active BWP and the CSI-RS or the SSB.

14. The method of claim 13, further comprising: transmitting at least one of physical random access channel (PRACH), physical uplink shared channel (PUSCH), and physical uplink control channel (PUCCH) on the active BWP of when the active BWP is an uplink BWP.

15. An apparatus for wireless communication, comprising:
at least one memory; and
at least one processor coupled with the at least one memory and configured to cause the apparatus to:
receive first configuration information indicating an association between a bandwidth part (BWP) and a reference signal (RS);
determine a first RS, which is indicated by second configuration information, is user equipment (UE) selected, or is predefined in one or more specifications,
wherein the first RS is a synchronization signal block (SSB) indicated by a physical downlink control channel (PDCCH) order; and
determine an active BWP based on the first RS and the association between the BWP and the RS,
wherein the association between the BWP and the RS indicates an association between the active BWP and the SSB.

16. The apparatus of claim 15, wherein the first RS is at least one aperiodic sounding reference signal (SRS) triggered by downlink control information (DCI).

17. An apparatus for wireless communication, comprising:
at least one memory; and
at least one processor coupled with the at least one memory and configured to cause the apparatus to:
receive first configuration information indicating an association between a bandwidth part (BWP) and a reference signal (RS);
determine a first RS, which is indicated by second configuration information, is user equipment (UE) selected, or is predefined in one or more specifications;
determine an active BWP based on the first RS and the association between the BWP and the RS,
wherein the first RS is a synchronization signal block (SSB) for determining a random access channel (RACH) occasion (RO) for a physical random access channel (PRACH) transmission, and the association between the BWP and the RS indicates the association between the active BWP and the SSB.

18. An apparatus for wireless communication, comprising:
at least one memory; and
at least one processor coupled with the at least one memory and configured to cause the apparatus to:
receive first configuration information indicating an association between a bandwidth part (BWP) and a reference signal (RS);
determine a first RS, which is indicated by second configuration information, is user equipment (UE) selected, or is predefined in one or more specifications;
determine an active BWP based on the first RS and the association between the BWP and the RS,
wherein the first RS is associated with a candidate RS during a backhaul failure recovery (BFR) procedure.

19. The apparatus of claim 18, wherein the candidate RS is a channel state information (CSI)-RS or a synchronization signal block (SSB), and the association between the BWP and the RS indicates the association between the active BWP and the CSI-RS or the SSB.

20. The apparatus of claim 18, wherein the at least one processor is further configured to cause the apparatus to: transmit at least one of physical random access channel (PRACH), physical uplink shared channel (PUSCH), and physical uplink control channel (PUCCH) on the active BWP when the active BWP is an uplink BWP.

* * * * *